3,481,928
1,2-DIHYDRO-4-HYDROXY-QUINAZOLINO-3-OXIDES

Erhard Wolf, Frankfurt am Main, and Elmar Schrinner, Wiesbaden, Germany, assignors to Farbwerke Hoechst Aktiengesellschaft vormals Meister Lucius & Brüning, Frankfurt am Main, Germany, a corporation of Germany
No Drawing. Filed June 30, 1966, Ser. No. 561,761
Claims priority, application Germany, July 16, 1965, F 46,616
Int. Cl. C07d 51/36, 51/46, 51/48
U.S. Cl. 260—240.9       12 Claims

ABSTRACT OF THE DISCLOSURE 1,2-dihydro-4-hydroxy-quinazolino-3-oxides of the formula

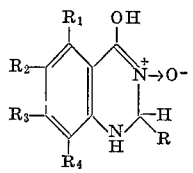

in which $R_1$–$R_4$ represent hydrogen, halogen, nitro, hydroxy, alkyl, aryl, or a fused benzene ring, useful as urinary disinfectants, and a method for making them by the condensation of an o-aminohydroxamic acid with an aldehyde.

---

The present invention relates to heterocyclic compounds and to a process for their manufacture wherein o-aminohydroxamic acids of the general formula

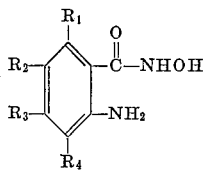

in which $R_1$, $R_2$, $R_3$ and $R_4$ are identical or different and each represent a hydrogen atom, an alkyl or aryl radical, halogen, or a nitro or hydroxy group, or two vicinal substituents together represent a fused benzene ring, are reacted with aldehydes of the general formula

in which R represents a hydrogen atom, an alkyl, alkenyl or aryl group which may be substituted, or an heterocyclic radical which may be substituted, or with their acylates to obtain quinazoline compounds of the general formula

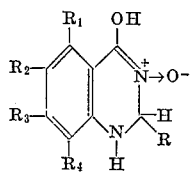

in which R and $R_1$ to $R_4$ have the meanings given above. If desired, the compounds obtained may be dehydrated to yield the corresponding quinazolones.

The following reaction scheme illustrates the process of the invention:

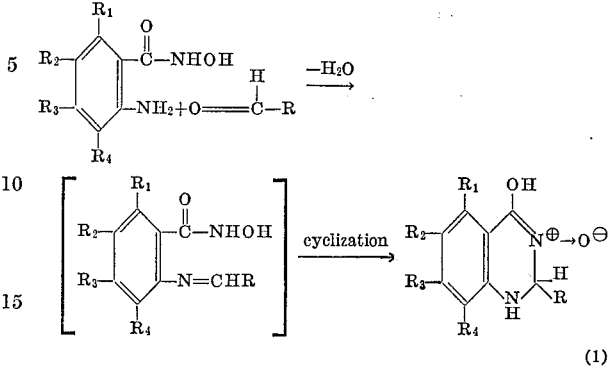

(1)

As a rule, Schiff bases cannot be isolated, but they are transposed at once under the reaction conditions to yield the corresponding cyclic 1,2 - dihydro - 4 - hydroxy-3-N-oxides. These compounds may also be formulated as 1,2-dihydro-3-hydroxy-4-keto-compounds:

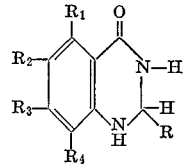

The anthranilhydroxamic acids used as starting materials may carry functional groups, such as, for example, in 5-nitro-anthranilhydroxamic acid, 3,5-dibromo-anthranilhydroxamic acid, 4-chloro-anthranilhydroxamic acid, 5-chloro-anthranilhydroxamic acid, and 4-hydroxy-anthranilhydroxamic acid, and/or they may be alkylated such as, for example, in 4-methyl-anthranilhydroxamic acid and 4-methyl-5-hydroxy-anthranilhydroxamic acid. Another benzene ring may also be fused thereto such as, for example, in 1-amino-2-naphthohydroxamic acid or in 2-amino-3-naphthohydroxamic acid. These hydroxamic acids can be prepared in known manner, preferably, by reaction of correspondingly substituted anthranilic acid esters with hydroxylamine.

As aldehydes may be used saturated or unsaturated aliphatic, aromatic and heterocyclic compounds which may carry any substituent. The acylates of the aldehydes, preferably the easily obtainable diacetates, may also be used, for example, furfural-diacetates such as 5-nitro-furfural-diacetate, if desired, in the presence of water.

As saturated aliphatic aldehydes which may be used for the reaction, there may, for example, be mentioned: Formaldehyde, acetaldehyde, isobutyraldehyde, γ-chloro-butyr-aldehyde, laurin-aldehyde, levulin-aldehyde or 1-bromo-cyclohexane-1-aldehyde. As unsaturated aliphatic aldehydes there may be mentioned acrolein and crotonic aldehyde, as aromatic aldehydes there may be used 4-nitro-cinnamaldehyde, phenyl-acetaldehyde, 2-methoxy-benzaldehyde, naphthalene - 1-aldehyde, 2-naphthol-3-aldehyde, 2 - chloro - 6-nitro-benzaldehyde, 3-hydroxy-benzaldehyde, 3-nitro-benzaldehyde, 4-diethylamino-benz-aldehyde, 4 - sulfamido-benzaldehyde or 3-trifluoromethyl-benzaldehyde. As heterocyclic aldehydes may finally be mentioned benzothiazol-2-aldehyde, furfural, 5-nitro-furfural, pyrazol-3-aldehyde, pyridino-4-aldehyde, thiophene-2-aldehyde or quinolino-4-aldehyde.

It is advantageous to carry out the reaction at temperatures ranging from 0° to 150° C. Depending on the reactivity of the aldehyde, the reaction is more or less exothermic. It is furthermore advantageous to carry out the reaction in a solvent such as dimethyl-formamide, acetonitrile, tetrahydrofuran or lower alcohols. It may, however, also be effected without any solvent. In some cases, it may be advantageous to use the acetates of aldehydes. The acetates are advantageously reacted in an aqueous-alcoholic medium in the presence of dilute acids.

We have now found a process according to which it is possible to prepare novel 1,2-dihydro-4-hydroxy-quinazolino-3-N- oxides. It could have not been expected that the Schiff bases formed from anthranilhydroxamic acids and from aldehydes could be cyclized, under very mild conditions, to yield the quinazolino-3-N-oxides in a quantitative amount. It was more likely to assume that a simultaneous dehydration would occur according to the following equation:

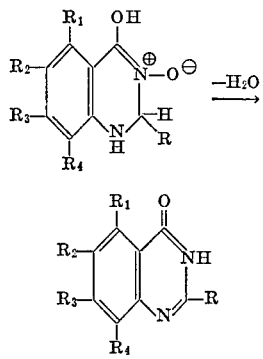

The dehydration, by which the corresponding quinazolone derivatives are obtained, does not automatically take place in the reaction of anthranilhydroxamic acids and aldehydes described. However, dehydration may be subsequently achieved in the usual manner, for example by azeotropic dehydration or in the presence of dehydrating agents. In addition, the process of the present invention is thus a process for the manufacture of corresponding quinazolone derivatives and it may successfully be used for their manufacture in those cases where certain quinazolone derivatives are difficultly obtained.

The quinazoline oxides prepared according to the process of the invention are weak acids and they form salts when mixed with inorganic or organic bases.

The product of the present invention have therapeutically valuable properties and may be used in chemotherapy. They are of low toxicity ($DL_{50}$>15 grams/kilogram in rats), have bacteriostatic activity and are particularly suitable for treating infections of the urinary passages. The may be administered per os in the form of the free acids or the salts thereof as tablets or dragées, if desired or required in admixture with pharmaceutically suitable carriers and/or stabilizers, or they may be administered parenterally. They may also be used in solution or suspension for rinsing the urinary passages and the bile-ducts.

As carriers, lactose, starch, tragacanth and magnesium stearate may be used for example.

The products of the invention are furthermore capable of a great number of further reactions and may therefore be used as intermediaries for the preparotion of the plant-protective agents and auxiliaries for synthetic materials.

EXAMPLE 1

16 grams (0.131 mol) of p-hydroxy-benzaldehyde were added to a solution of 20 grams of anthranilhydroxamic acid (0.131 mol) in 40 ml. of dimethyl-formamide at room temperature. After the temperature had been raised to 40° C., the reaction took place. After about an hour, the 1,2-dihydro-2-(4-hydroxy-phenyl)-4-hydroxy-quinazolino-3-oxide crystallized out. After a several hours' standing, 150 ml. of water were added, the yellowish crystals were filtered off with suction, washed with water and dried. The yield amounted to 32 grams (95% of the theoretical yield). The compound, which was obtained in almost analytically pure form, could be recrystallized from a mixture of dioxane and water and it melted at 222° C. in a heated melting point determination block.

Since the compounds described in this and in the following examples decomposed when heated, it was difficult to determine their melting points. The melting points have in each case been determined in a preliminarily heated block.

The substance had a violet iron(III)chloride reaction in an alcoholic solution, was soluble in dilute lyes, and—as a cyclic compound—was stable to boiling dilute acids.

Analysis.—$C_{14}H_{12}N_2O_3$; molecular weight=256.2. Calculated: N, 10.97%. Found: 10.9%.

EXAMPLE 2

35 grams (0.198 mol) of 4-nitrocinnamaldehyde were added to a solution of 30 grams of anthranilhydroxamic acid (0.197 mol) in 300 ml. of boiling acetonitrile. On cooling, 56 grams (91% of the theoretical yield) of 1,2-dihydro - 2 - (4'-nitrocinnamyl)-4-hydroxy-quinazolino-3-oxide crystallized out. After recrystallization from a mixture of dioxane and water, there were obtained 45 grams of the pure compound which melted at 217° C. in a pre-heated block. The substance had an intense violet iron(III)chloride reaction in an alcoholic solution, it was easily soluble in dilute lyes and stable against boiling dilute acids.

Analysis.—$C_{16}H_{13}N_3O_4$; molecular weight=311.3. Calculated: N, 13.5%. Found: N, 13%.

EXAMPLE 3

25 grams (0.348 mol) of isobutyraldehyde were added to 50 grams (0.329 mol) of anthranilhydroxamic acid in boiling acetonitrile. After a short while, 60 grams (89% of the theoretical yield) of 1,2-diyhdro-2-isopropyl-4-hydroxy-quinazolino-3-oxide crystallized out in almost analytically pure form. The compound could be recrystallized from a mixture of dimethyl-formamide and water and it melted at 180° C. in a pre-heated block. The substance, which as a cyclic compound was stable to dilute acids, was easily soluble in dilute lyes as well as in alcohol and acetone.

Analysis.—$C_{11}H_{13}N_2O_2$; molecular weight=206.2. Calculated: C, 64.1%; H, 6.38%. Found: C, 64.0%; H, 6.9%.

When 61 grams of chloranthranilhydroxamic acid were used instead of anthranilhydroxamic acid, there was obtained 1,2-dihydro-2-isopropyl-4-hydroxy-7-chloro-quinazolino-3-oxide which melted at 190° C. (in a pre-heated block) in a yield of 70%. The compound was soluble in alcohol and in lyes and it was stable against dilute acids.

Analysis.—$C_{11}H_{13}Cl_1N_2O_2$; molecular weight=240.7. Calculated: C, 54.9%; H, 5.4%. Found: C, 54.9%; H, 5.5%.

EXAMPLE 4

22.5 grams (0.148 mol) of anthranilhydroxamic acid were suspended in ethanol and the whole was reacted with 16 grams (0.15 mol) of pyridino-4-aldehyde within 5 minutes. The hydroxamic acid entered into solution with exothermic reaction. After a short standing, the 1,2-dihydro - 2-(4'-pyridyl) - 4-hydroxy-quinazolino - 3-oxide crystallized out in an almost quantitative yield in analytically pure form. The compound could be recrystallized from a mixture of dimethyl-formamide and water and it melted at about 224° C. in a pre-heated block. It was soluble in lyes and acids.

Analysis.—$C_{13}H_{11}N_3O_2$; molecular weight=241.2. Calculated: N, 17.42%. Found: N, 17.3%.

EXAMPLE 5

33 grams of 4-methyl-anthranilhydroxamic acid (0.199 mol) were refluxed with 30 grams of piperonal (0.2 mol) in acetonitrile for 1½ hours. On cooling in iced water, 48 grams (81% of the theoretical yield) of 1,2-dihydro-2-(3',4'-methylenedioxy-phenyl) - 4-hydroxy - 7-methylquinazolino - 3-oxide crystallized out. The compound could be recrystallized from a mixture of dimethyl-formamide and water. The slightly yellow crystals melted at 205° C. in a pre-heated block.

Analysis.—$C_{16}H_{14}N_2O_4$; molecular weight=298.3. Calculated: N, 9.39%. Found: N, 9.1%.

EXAMPLE 6

2.8 grams (0.0262 mol) of pyridino-4-aldehyde were added to a solution of 5 grams (0.027 mol) of 3-amino-naphtho-(2)-hydroxamic acid (melting at 202–203° C. with decomposition in a preheated block) in 20 ml. of dimethyl-formamide which had been heated to 40° C. After a 30 minutes' standing at 40° C., the temperature was slowly raised. At 80° C., the 1,2-dihydro-2-(4'-pyridyl) - 4-hydroxy-benzo[g]quinazolino-3-oxide crystallized. The crystals, which had been filtered off with suction, were boiled out with 30 ml. of acetonitrile. The yield of the analytically pure substance amounted to 6.5 grams (90% of the theoretical yield). The compound was easily soluble in dilute lyes and acids. In an alcoholic solution, it had a violet iron(III)chloride reaction. The crystals did not melt at temperatures below 300° C.

Analysis.—$C_{17}H_{13}N_3O_2$; molecular weight: 291.3. Calculated: C, 70.1%; H, 4.5%; N, 14.43%. Found: C, 69.9%; H, 4.6%; N, 14.2%.

EXAMPLE 7

16 grams (0.12 mol) of α-naphthaldehyde were added while stirring to a suspension of 15 grams (0.0986 mol) of anthranilhydroxamic acid in 25 ml. of ethanol. While heating to 45° C., there was obtained a limpid solution from which the 1,2-dihydro-2-(α-naphthyl)-4-hydroxy-quinazolino - 3-oxide crystallized out. After addition of 100 ml. of water, there were obtained 27 grams (91% of the theoretical yield) of the compound, which melted at 203–205° C. in a pre-heated block after recrystallization from butyl-acetate. The quinazoline oxide was stable against boiling dilute acids and had a violet iron(III) chloride reaction in an alcoholic solution. It was easily soluble in dilute lyes.

Analysis.—$C_{18}H_{14}N_2O_2$; molecular weight: 290.3. Calculated: C, 74.5%; H, 4.86%; N, 9.65%. Found: C, 74.65%; H, 4.7%; N, 9.5%.

EXAMPLE 8

22 grams (0.156 mol) of 5-nitro-furfural were added to a suspension of 25 grams (0.1665 mol) of anthranilhydroxamic acid in 50 ml. of methanol. An exothermic reaction provided a limpid solution from which 30 grams (70% of the theoretical yield) of yellow crystals of the 1,2-dihydro - 2-(5'-nitro-furyl) - 4-hydroxy-quinazolino-3-oxide separated on cooling. The compound melted at 162–163° C. in a pre-heated block, it was stable against boiling dilute acids and it had a violet iron(III)chloride reaction in an alcoholic solution.

Analysis.—$C_{12}H_9N_3O_5$; molecular weight=275.2. Calculated: N, 15.3%. Found: N, 15.3%.

EXAMPLE 9

10 grams of 1,2-dihydro - 2-phenyl - 4-hydroxy-quinazolino - 3-oxide were refluxed in cymene. The water formed was separated by means of a water separator. This process took about 2 hours. After cooling, the crystals were filtered off with suction. There were obtained 6 grams (65% of the theoretical yield) of 2-phenyl-quinazolone which melted at 238° C. after recrystallization.

When the 2-isopropyl compound was treated under the same conditions, 2-isopropyl-quinazoline, which melted at 228° C., was obtained in a 68% yield.

EXAMPLE 10

1.52 grams (0.01 mol) of anthranilhydroxamic acid were mixed with 1.1 gram (0.01 mol) of benzaldehyde at room temperature. While heating to 60° C., the condensation took place with simultaneous solidification of the reaction product. By recrystallization from ethyl-acetate, there were obtained 1.6 gram of the 1,2-dihydro-2-phenyl-4-hydroxy-quinazolino-3-oxide. Another pure fraction was obtained by concentration of the mother liquor. The total yield amounted to 81%. The compound was easily soluble in alcohol, acetone, acetonitrile and in dilute lyes. It was stable against boiling dilute acids. In alcohols, it had an intensely violet iron(III)chloride reaction. The crystals melted at 164–165° C. in a pre-heated block.

Analysis.—$C_{14}H_{12}N_2O_2$; molecular weight=240.2. Calculated: N, 11.66%. Found: N, 11.5%.

EXAMPLE 11

78 grams (0.322 mol) of nitro-furfural-acetate in 600 ml. of methanol were added to a solution, which had been heated to 50° C., of 45 grams (0.296 mol) of anthranilhydroxamic acid in 500 ml. of 2 N sulfuric acid. During this process, the temperature rose by about 5° C. The suspension was heated to 55–60° C. for 1½ hours, whereupon a limpid solution was formed. When poured into 6 liters of iced water, the 1,2-dihydro-2-(5'-nitrofuryl)-4-hydroxy-quinazolino-3-oxide formed precipitated as yellow crystals. When dried, the crystals were stirred twice with 200 ml. of benzene, filtered off with suction, washed with a little amount of benzene and purified in a mixture of methanol and water while adding active carbon. The yield of the pure compound amounted to 62 grams (76% of the theoretical yield). The compound was identical with the substance prepared according to Example 8.

EXAMPLE 12

25 grams (0.134 mol) of 5-chloro-anthranilhydroxamic acid were dissolved in 150 ml. of boiling acetonitrile and 19 grams (0.135 mol) of nitro-furfural were added. The limpid solution was refluxed for 5 minutes. After cooling, the 1,2-dihydro-2-(5'-nitrofuryl) - 4 - hydroxy-6-chloro-quinazolino-3-oxide crystallized out as yellow crystals. The yield amounted to 39 grams (94% of the theoretical yield). The substance was stable against boiling 2 N hydrochloric acid. In alcohol, it had an intense violet iron (III)chloride reaction. In the melting point determination block according to Dr. Lindström, the substance, which was introduced at 200° C., sintered and melted at 208° C. with foaming.

Analysis.—$C_{12}H_8Cl_1N_3O_5$; molecular weight=309.7. Calculated: C, 46.52%; H, 2.6%; N, 13.57%. Found: C, 46.9%; H, 2.9%; N, 13.35%.

EXAMPLE 13

30 grams (0.197 mol) of anthranilhydroxamic acid and 30 grams (0.201 mol) of p-dimethyl-aminobenzaldehyde were refluxed in 300 ml. of acetonitrile for 1½ hours. After about an hour, the dihydroquinazoline oxide began to crystallize out. When cool, the compound was filtered off with suction and was heated to boiling in a mixture of 100 ml. of acetonitrile and 30 ml. of water. At room temperature, the yellowish needles were filtered off with suction and dried. The yield amounted to 24.5 grams (44% of the theoretical yield). The 1,2-dihydro-2-p-dimethyl - aminophenyl - 4 - hydroxy - quinazolino - 3 - oxide obtained had an intense blue-violet iron(III)chloride reaction in an alcoholic solution. The compound, which was introduced into the melting point determination block at 190° C., decomposed at 199–200° C.

Analysis.—$C_{16}H_{17}N_3O_2$; molecular weight=283.3. Calculated: C, 67.83%; H, 6.05%; N, 14.83%. Found: C, 68.0%; H, 6.2%; N, 14.9%.

EXAMPLE 14

25 grams (0.134 mol) of 2-amino-4-chloro-benzohydroxamic acid and 19 grams (0.135 mol) of nitro-furfural were refluxed in 100 ml. of dioxane for 4 hours. The crystals of the 1,2-dihydro-2-(5'-nitrofuryl)-4-hydroxy-7-chloro-quinazolino-3-oxide which precipitated on cooling were recrystallized from 100 ml. of dioxane. The yield of the pure substance amounted to 40 grams (97% of the theoretical yield). The compound was soluble in dilute alkalis with a dark brown color and it was stable against boiling 2 N hydrochloric acid. The compound which was introduced into the melting point determination block at 210° C., sintered while taking a brown color and decomposed at 216° C. with foaming.

Analysis.—$C_{12}H_8Cl_1N_3O_5$; molecular weight=309.7. Calculated: C, 46.53%; H, 2.6%; Cl, 11.45%. Found: C, 46.2%; H, 2.95%; Cl, 11.3%.

EXAMPLE 15

5 grams (0.0319 mol) of 5-nitro-thiophene-2-aldehyde were added to a suspension of 5 grams (0.0329 mol) of anthranilhydroxamic acid in 10 ml. of ethanol, whereupon the temperature rose by 3° C. and the substance took a yellow color. After stirring for 15 hours, 20 ml. of isopropyl-ether were added, the yellow crystals were filtered off with suction and washed with isopropyl-ether. The yield was 7.5 grams (81.6% of the theoretical yield). The 1,2 - dihydro-2-(5-nitro-thienyl)-4-hydroxy-quinazolino-3-oxide obtained decomposed at temperature exceeding 100° C. The compound which had been introduced into the melting point determination block at 145° C., melted at 149–150° C. with decomposition.

Analysis.—$C_{12}H_9N_3O_4S_1$; molecular weight: 291.3. Calculated: N, 14.43%; S, 11.01%. Found: N, 14.0%; S, 11.0%.

EXAMPLE 16

18.5 grams (0.152 mol) of p-hydroxy-benzaldehyde were added to a solution, which had been heated to 40° C. of 25 grams (0.151 mol) of 4-methyl-anthranilhydroxamic acid in 35 ml. of dimethylformamide. After 10 hours' standing, the crystals of 1,2-dihydroxy-2-hydroxyphenyl - 4 - hydroxy - 7 - methyl - quinazolino-3-oxide which precipitated were filtered off with suction. After recrystallization from acetone, there were obtained 31 grams (76% of the theoretical yield) of an analytically pure compound. The crystals, which slowly decomposed on heating above 100° C. were stable against boiling 2 N hydrochloric acid and had a violet iron(III)chloride reaction in an alcoholic solution.

Analysis.—$C_{15}H_{14}N_2O_3$; molecular weight=270.3. Calculated: N, 10.37%. Found: N, 10.6%.

EXAMPLE 17

15 grams (0.0987 mol) of anthranilhydroxamic acid in 175 ml. of 2 N sulfuric acid were refluxed with 21 grams (0.1 mol) of benzaldehyde diacetate in 200 ml. of methanol for 2 hours. The 1,2-dihydro-2-phenyl-4-hydroxy-quinazolino-3-oxide formed could be isolated in an average yield of 85% by precipitation with water or distilling off methanol. The compound was identical with the substance prepared according to Example 10.

EXAMPLE 18

37 grams (0.198 mol) of 4-chloro-anthranilhydroxamic acid and 15 grams (0.21 mol) of isobutyraldehyde were refluxed in 150 ml. of ethanol for 2 hours. The crystals which were left after the solvent had been drawn off were recrystallized from a mixture of ethanol and water or from benzene. The yield amounted to 39 grams (82% of the theoretical yield) of 1,2-dihydro-2-isopropyl - 4-hydroxy - 7 - chloro - quinazolino - 3 - oxide. The slightly yellow crystals, which had an intense dark red iron(III) chloride reaction in an alcoholic solution, melted at 178° C.

Analysis.—$C_{11}H_{13}Cl_1N_2O_2$; molecular weight=240.7. Calculated: C, 54.88%; H, 5.44%; Cl, 14.73%. Found: C, 54.9%; H, 5.5%; Cl, 14.4%.

We claim:
1. A 1,2 - dihydro - 4 - hydroxy - quinazolino - 3-oxide of the formula

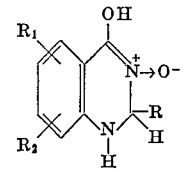

wherein R is hydroxyphenyl, methylenedioxyphenyl, dimethylaminophenyl, nitrostyryl, pyridyl, nitrofuryl, or nitrothienyl, and $R_1$ and $R_2$, taken alone, each represent hydrogen, lower alkyl, halogen, or hydroxy, and, taken together with vicinal carbon atoms to which they are attached, represent a benzene ring; and the pharmaceutically acceptable salts thereof.

2. 1,2 - dihydro - 2 - (4 - hydroxy-phenyl)-4-hydroxy-quinazolino-3-oxide.

3. 1,2 - dihydro - 2 - (4' - pyridyl) - 4 - hydroxy-quinazolino-3-oxide.

4. 1,2 - dihydro - 2 - (4' - pyridyl) - 4 - hydroxy-benzo [g]quinazolino-3-oxide.

5. 1,2 - dihydro - 2 - (5' - nitro-furyl)-4-hydroxy-quinazolino-3-oxide.

6. 1,2 - dihydro - 2 - (5' - nitrofuryl)-4-hydroxy-6-chloro-quinazolino-3-oxide.

7. 1,2 - dihydro - 2 - p - dimethyl-aminophenyl-4-hydroxy-quinazolino-3-oxide.

8. 1,2 - dihydro - 2 - (5' - nitrofuryl)-4-hydroxy - 7-chloro-quinazolino-3-oxide.

9. 1,2 - dihydro - 2 - (5 - nitro - thienyl) - 4 - hydroxy-quinazolino-3-oxide.

10. 1,2 - dihydro - 2 -p - hydroxyphenyl-4-hydroxy-7-metyl-quinazolino-3-oxide.

11. 1,2 - dihydro - 2 - (4' - nitrostyryl)-4-hydroxy-quinazolino-3-oxide.

12. 1,2 - dihydro -2 - (3',4' - methylenedioxy-phenyl)-4-hydroxy-7-methyl-quinazolino-3-oxide References Cited

UNITED STATES PATENTS 3,162,636  12/1964  Gurien et al. _____ 260—251
3,226,387  12/1965  Newbold et al. _____ 260—251

ALEX MAZEL, Primary Examiner

R. V. RUSH, Assistant Examiner

U.S. Cl. X.R.

260—251, 256.4, 500.5; 424—251